Jan. 11, 1938.　　　　G. C. PEARCE　　　　2,105,005
MOTOR CONTROL
Original Filed Oct. 12, 1932　　2 Sheets-Sheet 1

INVENTOR.
BY George C. Pearce
ATTORNEYS

Patented Jan. 11, 1938

2,105,005

UNITED STATES PATENT OFFICE 2,105,005

MOTOR CONTROL

George C. Pearce, Dayton, Ohio, assignor, by mesne assignments, to General Motors Corporation, Dayton, Ohio, a corporation of Delaware Original application October 12, 1932, Serial No. 639,461. Patent No. 2,018,896, dated October 29, 1935. Divided and this application May 20, 1935, Serial No. 22,422

18 Claims. (Cl. 172—279)

This application is a division of my copending application Serial No. 639,461, filed October 12, 1932, now Patent No. 2,018,896, dated October 29, 1935.

This invention relates to refrigeration and/or to starting controls for electric motors.

Certain types of refrigerating systems operate intermittently, the temperatures are maintained in the object to be cooled by starting and stopping the refrigerating system to produce refrigeration intermittently. Other types of refrigeration systems operate substantially continuously and some type of throttling or governing device is provided for varying the refrigerating capacity of the system in accordance with refrigeration demands in such a manner that the desired temperatures are maintained in the object to be cooled. In either case, the refrigerating system is stopped periodically for adjustments, defrosting, or for transportation of the system. The system, if it be of the compressor-condenser-evaporator type, is generally driven by an electric motor and it is necessary to provide a control for the electric current to the motor so that it may start properly and unfailingly. It is among the objects of this invention to provide a starting control for an electric motor which is capable of governing the current flowing to the motor efficiently and without likelihood of failure, regardless of unfavorable operating conditions and varying line voltages.

Further objects and advantages of the present invention will be apparent from the following description, reference being had to the accompanying drawings, wherein a preferred form of the present invention is clearly shown.

A refrigerating system embodying features of this invention may include a compressor 10 delivering refrigerant to a condenser 11 from whence the refrigerant flows to the evaporator 12 and returns through the return line 13 to the compressor 10. Between the condenser 11 and the evaporator 12 is an expansion device 14 which maintains the necessary pressure differential between the condenser 11 and the evaporator 12. Preferably this refrigerating system is of the substantially continuously operating type in which the parts are so co-related with the refrigeration demands of the object to be cooled that the system inherently maintains the desired temperature in the object notwithstanding variations in the atmospheric temperature. Such a system includes a continuously open expansion device in the form of a fixed elongated orifice. If the system should be stopped for any reason, the pressures within the refrigerating system equalize within a relatively short time such as within one quarter to one half hour. Such a system is more particularly described in the application of Andrew A. Kucher, Serial No. 599,239 filed March 16, 1932 to which reference is hereby made for further disclosure of such a system.

Figure 1:
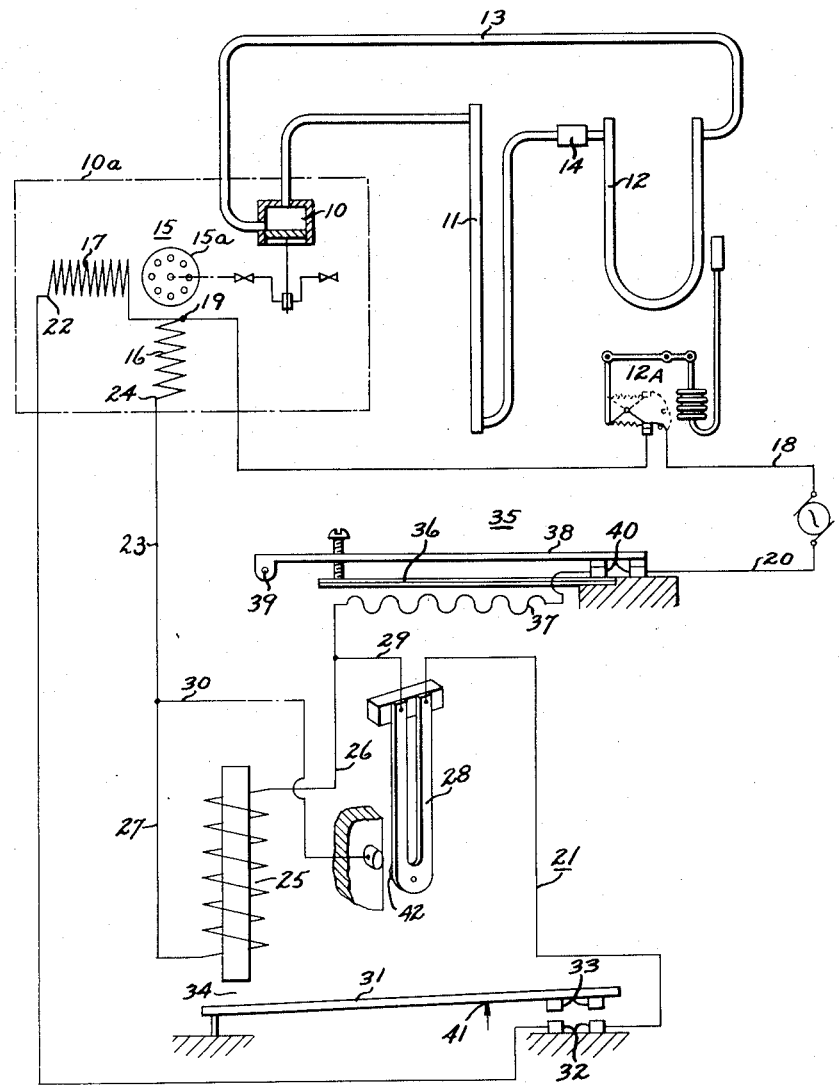
Fig. 1 is a diagrammatic showing of a refrigerating system embodying features of this invention.

The compressor 10 is driven by an electric motor 15 which may be placed in a hermetic casing 10a with the compressor, and which may be of the split phase type having a rotor 15a, a running winding 16 and a starting winding 17. My improved control so governs the flow of current to these windings, that the current flows to both windings during the necessary normal starting period of the motor and the current is disconnected from the starting winding 17 after the termination of the normal starting period of the motor. To this end, as shown in Fig. 1, a common lead line 18 is connected to the running and starting windings at 19. Another lead line 20 is divided into a starting lead line 21 connected to the starting winding at 22 and also into a running lead line 23 connected to the running winding 16 at the point 24. An electromagnet 25 is placed in the running lead line 23 and is connected by the branches 26 and 27 in the running lead line. A shunt is placed in the running lead line so that the electromagnet 25 may be shunted out of the system, and this shunt may include a timing device 28, conveniently in the form of a bimetallic U-shaped member connected by the shunt branches 29 and 30 of the running lead line. The electromagnet 25 is provided with an armature 31 which includes means or contacts 32 and 33 for opening and closing the starting lead line 21. The armature 31 can retract from the magnet 25 a sufficient distance 34, such that it is attracted to the magnet 25 in response to the starting surge current passing through the running winding 16, but the space 34 is sufficiently large that the armature 31 is not attracted to the magnet during the normal running current flowing through the running winding if, for any reason, the armature 31 is permitted once to assume its retracted position.

In addition, an overload device 35 is placed in the electric circuit, so that it stops the flow of current in response to an excess current flowing to the motor for an excessive period of time. Conveniently the overload device 35 is placed in the line 20 and includes a bimetallic member 36 heated by a resistance 37 through which the current flowing from the line 20 to the motor 15 passes. The bimetallic member 36 upon being heated beyond a normal temperature by the resistance 37 causes the lever 38 to pivot about the point 39 and open the contacts 40 to stop the flow of current to the motor 15.

The operation of the system shown in Fig. 1 is as follows: When current is first caused to flow through the system, it passes through the lead line 20, the running lead line 23, the running winding 16, and the common lead line 18. At this time, the current flows through the branches 26 and 27 and the electromagnet 25. The electromagnet, in response to the starting surge current through the running winding 16, attracts the armature 31, so that it pivots about the fulcrum 41 and closes the contacts 32 and 33, thus causing current to flow through the starting lead line 21 and the starting winding 17. The starting current in passing through the timing device 28, which, in this form, is a bimetallic U-shaped member, causes it to bend to close contacts 42. When these contacts are closed, the electromagnet is shunted out of the circuit, the current flowing through the branches 29, 30, a portion of the member 28 and contacts 42. The time required for the completion of this bending action of the timing device 28 is sufficiently long, so that the contacts 42 are not closed until after the normal period of time required for the motor to start. After this period of time, the magnet 25 is shunted out of the circuit and the armature 31 retracts from the magnet 25 and opens the contacts 33 and 34, thus stopping the flow of current to the starting winding 17. Bimetallic member 28 is so calibrated, that when the starting current ceases to flow through it, it separates the contacts 42 and thus the current flows to the motor only through the lead line 20, the branches 26, 27, and the electromagnet 25, the running winding 16, and the lead line 18. Since the motor has attained speed, the current flowing through the electromagnet 25 is only the normal running current and this is insufficient to attract the armature 31 to the magnet 25 after the armature has been permitted to retract by the shunting action heretofore described. The motor continues to operate in this manner until it is stopped either by the overload device 35, by a thermostatic switch 12a or similar device which controls the refrigerating effect of the system, or by any other automatic or manual switch which may be conveniently placed in the system.

Figure 2:
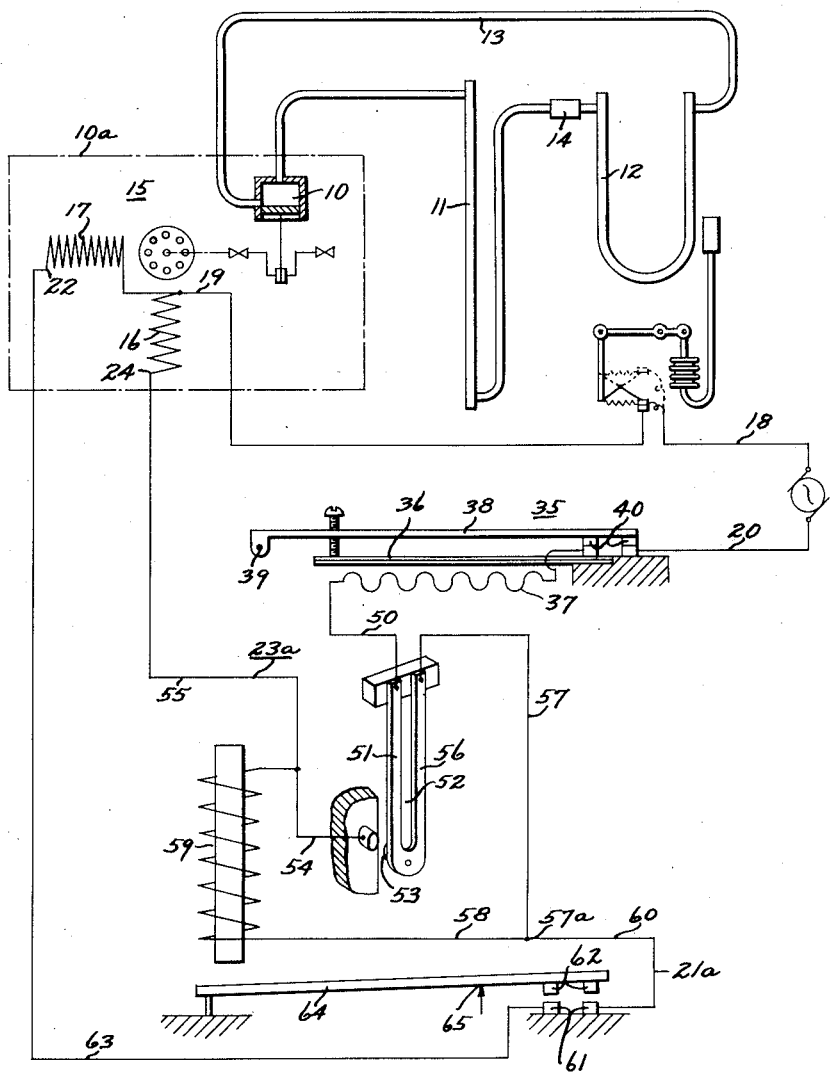
Fig. 2 is a diagrammatic showing of a slightly modified form of the invention.

In the modification shown in Fig. 2, the refrigerating system may be identical with that shown in Fig. 1 and hence corresponding parts are given identical numbers. The motor 15 may also be identical with that shown in Fig. 1 and hence its rotor, running winding and starting winding are given identical numbers. In this modification a common lead line 18 is also provided, this being connected to the running and starting windings at the point 19. Another lead line 20 is provided having the overload device 35 identical with that described in Fig. 1 including the bimetallic member 36 and the resistance 37, arm 38, fulcrum 39, and contacts 40. The starting line 21a and the running lead line 23a are slightly modified.

The branch 50, timing device 52 and branch 51 are parts of both the running lead line 23a and the starting lead line 21a. From the point 51a on part of the running lead line 23a includes the branch 58, electromagnet 59 and branch 55 leading to the running winding 16 at 24. Another part of the running lead line includes the contacts 53 and the branch 54. The starting lead line 21a includes the branch 60, contacts 61, 62, and the branch 63 leading to the starting winding 17 and 22.

In modification shown in Fig. 2, when the current is first introduced into the system, it flows through the lead 20, contacts 40, resistance 37, branch 56, legs 51, 56, branches 57, 58, electromagnet 59, branch 55, running winding 16, and common lead 18. The current flowing through the magnet 59 attracts the armature 64 pivoted at 65 and closes the contacts 61 and 62. Current then also flows through these contacts and the branches 60 and 63 to the starting winding 17. The current flowing through the timing device 52, which at this time includes the total current required by the starting and running windings under starting conditions is sufficient to cause the device 52 to close the contacts 53 after the normal starting period of the motor, and the device 52 is so calibrated that it will not close these contacts until the motor has started. When the contacts 53 are closed, the electromagnet 59 is shunted by a flow of current through the leg 51, contacts 53, branches 54 and 55 to the running winding 16. When this shunting action occurs, the armature 64 retracts from the magnet and opens the contacts 61 and 62, thus stopping the flow of current to the starting winding 17. The resistance of the device 52 is so calibrated that the current flowing to the running winding alone under any condition and passing through the leg 51 alone, or through both legs 51 and 56, is insufficient to maintain the device 52 in a sufficiently heated condition and therefore the contacts 53 begin to separate as soon as the starting winding is cut out. When the contacts 53 separate current flows from the line 20 through the branch 50 device 52, branches 57 and 58, electromagnet 59 and branch 55 to the running winding without closing the contacts 61, 62, since the magnet 59 is so calibrated that it cannot attract the armature 64 to it even with the highest normal running current passing through it, but can be attracted by the starting surge current flowing to the running winding. The device 52 is therefore cooled off and in readiness to initiate a starting cycle practically as soon as the previous starting cycle is terminated.

In both modifications shown in Figs. 1 and 2, the cooling action of the timing devices 28 and 52 are so calibrated with respect to the cooling action of the overload device 35, that, should the overload device 35 open the contacts 40, the timing devices 28 and 52 will have cooled and be in readiness to function before the overload device 35 has cooled and reclosed contacts 40. This is accomplished by making the members of the proper relative weight or by proper thermal insulation of the members to accomplish this result, as will be understood by those skilled in the art.

In the type of continuously operating system described in the application of Andrew A. Kucher, above referred to, it sometimes happens that the source of electric current fails temporarily either because of an electric storm or other causes, but is restored in a relatively short time. Sometimes the temporary failure is of sufficient length to permit the refrigerating system to equalize as to refrigerant pressures, but at other times the failure is of such a short duration that the refrigerant pressure cannot equalize sufficiently to unload the compressor 10 to permit the motor 15 to start. Under these conditions, when the current returns, the starting cycle will take place as usual, the current flowing through both the running winding and starting windings for the normal starting period; but since the motor is unable to start because of the high torque required, the current flowing through both windings during the starting period and the subsequent flow of current through the running winding of the stalled motor eventually causes the overload device 35 to open the contacts 40. After the contacts 40 are opened the overload device 35 starts to cool, but requires a longer length of time than is required by the timing devices 28 or 52 and hence when the overload device 35 has cooled sufficiently to close the contacts 40, the timing devices 28 and 52 are in readiness to reinitiate the starting cycle. Another starting cycle will then be completed, and if the compressor still prevents the motor from starting, another overloading action will occur and thus as many starting cycles will be repeated as required until the refrigerant pressures have equalized sufficiently to permit the motor to start. Since the system equalizes within 5 to 15 minutes, and since each overloading cycle requires from one to two minutes, the number of false starts is not excessive and will not burn out the motor.

While in the preferred embodiment, the timing devices 28 and 52 are so calibrated that they shunt the electromagnets every time that the motor is started, yet it is within the purview of this invention that these timing devices can be used merely as protective or safety devices for the usual surge current starting relay heretofore commonly used. Thus in Fig. 1, the electromagnet 25 may be so calibrated that it attracts the armature 31 when the starting surge current flowing to the running winding passes through it, but releases the armature because of the decrease in current when the motor has attained sufficient speed so that it can attain its normal running condition. This type of starting relay can be calibrated for the lowest likely voltage to be encountered during normal operation. Such a relay when so calibrated, however, is likely to fail to function when unusually high voltages are encountered. When such voltages are encountered, the current flowing to the running winding does not drop sufficiently after the motor has attained its starting speed to release the armature 31 and thus the starting winding is not cut out as long as the high voltages continue. The device 28, under these conditions of high voltage, can be used as a safety device and can be so calibrated that it starts to but does not close the contacts 42 under the normal or low voltages heretofore described, but that it will close the contacts 42 after the termination of the normal starting period and after failure of the armature 31 to drop during high voltages. Thus under such use of my invention, the timing device 28, while it still does shunt the electromagnet occasionally after the starting period, is used merely as a safety device which closes the contacts 42 only when the voltages are high enough to prevent the armature 31 from functioning normally.

Likewise the device 52 of Fig. 2 can be used merely as a safety device to operate only under the high voltages just described with respect to Fig. 1. In this case the electromagnet 59 can be so calibrated that for low or normal voltages it attracts the armature 64 by the running surge current during the starting period of the motor, but releases the armature when the running winding current drops after the motor has attained its starting speed. When high voltages are encountered, and the armature 64 fails to drop, the device 52 responds as a safety device and closes the contacts 53 to shunt the magnet 59 and permit the armature 64 to drop and thus cut out the starting winding 17. The electromagnet is then unable to reclose the starting contacts even under such high voltages. It is to be understood that such use of the timing devices 28 and 52 merely as safety devices as above described comes within the purview of my invention.

While the form of embodiment of the invention as herein disclosed, constitutes a preferred form, it is to be understood that other forms might be adopted, all coming within the scope of the claims which follow.

What is claimed is as follows:

1. In combination, a motor having a starting winding and a running winding, a running lead line connected to said running winding, a starting lead line connected to said starting winding, an electromagnet in said running lead line, said magnet having an armature with means for closing said starting lead line when said armature is attracted to said magnet and for opening said starting lead line when said armature is retracted from said magnet, a shunt in said running lead line around said electromagnet, and a timing device operable following the closing of the starting lead line circuit and responsive to flow of current through said motor for closing said shunt after a period of time following the closing of said starting lead line.

2. In combination, a motor having a starting winding and a running winding, a running lead line connected to said running winding, a starting lead line connected to said starting winding, an electromagnet in said running lead line, said magnet having an armature with means for closing said starting lead line when said armature is attracted to said magnet and for opening said starting lead line when said armature is retracted from said magnet, a shunt in said running lead around said electromagnet, and a timing circuit closing device operable mechanically independently of said armature and responsive to flow of current through said motor for closing said shunt after a period of time equal to the normal starting period of said motor.

3. In combination, a motor having a starting winding and a running winding, a running lead line connected to said running winding, a starting lead line connected to said starting winding, an electromagnet in said running lead line, said magnet having an armature with means for closing said starting lead line when said armature is attracted to said magnet and for opening said starting lead line when said armature is retracted from said magnet, a shunt in said running lead line around said electromagnet, and a thermostatic device responsive to flow of current through said motor for closing said shunt after a period of time equal to the normal starting period of said motor.

4. In combination, a motor having a starting winding and a running winding, a running lead line connected to said running winding, a starting lead line connected to said starting winding, an electromagnet in said running lead line, said magnet having an armature with means for closing said starting lead line when said armature is attracted to said magnet and for opening said starting lead line when said armature is retracted from said magnet, a shunt in said running lead line around said electromagnet, and a thermostatic device operable mechanically independently of said armature and responsive to flow of current through said motor for closing said shunt after a period of time equal to the normal starting period of said motor.

5. In combination, a motor having a starting winding and a running winding, an electromagnet in series with said running winding, an armature for said magnet closing a circuit to said starting winding in response to the starting surge current passing through said magnet to said running winding and a current responsive device in said circuit operable mechanically independently of said armature shunting said electromagnet after the normal period of time required for said motor to start.

6. In combination, a motor having a starting winding and a running winding, a running lead line connected to said running winding, a starting lead line connected to said starting winding, an electromagnet in said running lead line, said magnet having an armature with means for closing said starting lead line when said armature is attracted to said magnet and for opening said starting lead line when said armature is retracted from said magnet, a shunt in said running lead line around said electromagnet, and a safety timing device operable mechanically independently of the armature and responsive to the flow of current through said motor for closing said shunt.

7. In combination, a motor having a starting winding and a running winding, a running lead line connected to said running winding, a starting lead line connected to said starting winding, an electromagnet in said running lead line, said magnet having an armature with means for closing said starting lead line when said armature is attracted to said magnet and for opening said starting lead line when said armature is retracted from said magnet, a shunt in said running lead line around said electromagnet, and a safety timing device operable after the closing of said starting lead line and responsive to the flow of current through said motor for closing said shunt.

8. In combination, a motor having a starting winding and a running winding, an electromagnet in series with said running winding, an armature for said magnet closing a circuit to said starting winding in response to the starting surge current passing through said magnet to said running winding and a self resetting current responsive device operable after the closing of said starting winding circuit for shunting said electromagnet after the normal period of time required for said motor to start and for opening said shunt after said armature has opened said circuit.

9. In combination, an electric motor having a starting circuit and a running circuit, means energized by electric energy flowing through said running circuit for connecting said starting circuit to a source of electric energy, and self resetting means operable after the connecting of said starting circuit to the source of electric energy and upon a predetermined condition in a motor circuit for shunting said first mentioned means.

10. In combination, an electric motor having a starting circuit and a running circuit, means energized by electric energy flowing through said running circuit for connecting said starting circuit to a source of electric energy, and self resetting means operable mechanically independently of said first mentioned means and upon a predetermined condition in a motor circuit for deenergizing said first mentioned means.

11. In combination, an electric motor having a starting circuit and a running circuit, means energized by electric energy flowing through said running circuit for connecting said starting circuit to a source of electric energy, and self resetting means operable after the connecting of said starting circuit and upon a predetermined cumulative flow of electric energy through a motor circuit for deenergizing said first mentioned means.

12. In combination, an electric motor having a starting circuit and a running circuit, means energized by electric energy flowing through said running circuit for connecting said starting circuit to a source of electric energy, and self resetting circuit opening and closing means operable after the connecting of the starting circuit for deenergizing said first mentioned means after the motor has been properly energized.

13. In combination, a motor having a starting winding and a running winding, an electromagnet in series with said running winding, an armature for said magnet closing the circuit to said starting winding in response to the starting surge current passing through said magnet to said running winding, and a self resetting current responsive device operable mechanically independently of said armature for shunting said electromagnet after the normal period of time required for said motor to start and for opening said shunt after said armature has opened said circuit.

14. In combination, an electric motor having a starting circuit and a running circuit, means energized by electric energy flowing through said running circuit for connecting said starting circuit to a source of electric energy, and self resetting circuit opening and closing means operable mechanically independently of said first mentioned means for deenergizing said first mentioned means after said motor has been properly energized and has started to rotate.

15. In combination, an electric motor having a starting circuit and a running circuit, means energized by electric energy flowing through said running circuit for connecting said starting circuit to a source of electric energy, and self resetting means responsive to cumulative heating effect of the flow of energy through said motor for deenergizing said first mentioned means after the motor has been properly energized.

16. In combination, an electric motor having a starting circuit and a running circuit, means energized by electric energy flowing through said running circuit for connecting said starting circuit to a source of electric energy, a shunt having a negligible amount of resistance for shunting said first mentioned means, said shunt being provided with an automatically initiated self resetting circuit opening and closing means, said circuit opening and closing means being operated after the connecting of said starting winding circuit upon a predetermined condition in a motor circuit for closing said shunt to completely deenergize said first named means, said circuit opening and closing means being opened responsive to a different predetermined condition in a motor circuit.

17. In combination, a motor having a starting winding and a running winding, an electromagnet in series with said running winding, an armature for said magnet closing the circuit to said starting winding in response to the initial surge current passing through said magnet to said running winding, and self resetting means responsive to cumulative heating effect of the flow of energy through said motor and operable mechanically independently of said armature for shunting said electromagnet after the normal period of time required for said motor to start.

18. In combination, a motor having a starting winding and a running winding, an electromagnet in series with said running winding, an armature for said magnet closing a circuit to said starting winding in response to the initial surge current passing through said magnet to said running winding, and a current responsive device in series with one of said windings operable after the closing of the circuit to the starting winding for shunting said electromagnet after the normal period of time required for the motor to start.

GEORGE C. PEARCE.